United States Patent [19]
von Windheim

[11] Patent Number: 5,679,895
[45] Date of Patent: Oct. 21, 1997

[54] DIAMOND FIELD EMISSION ACCELERATION SENSOR

[75] Inventor: Jesko von Windheim, Raleigh, N.C.

[73] Assignee: Kobe Steel USA, Inc., Research Triangle Park, N.C.

[21] Appl. No.: 432,518

[22] Filed: May 1, 1995

[51] Int. Cl.[6] .................................................. G01P 15/08
[52] U.S. Cl. .................... 73/514.25; 313/336; 73/514.16
[58] Field of Search .................................. 313/309, 336, 313/351; 73/862.625, 514.18, 514.16, 514.21, 514.17, 514.25, 1 D, 514.35

[56] References Cited

U.S. PATENT DOCUMENTS

| | | | |
|---|---|---|---|
| 4,084,942 | 4/1978 | Villalobos | 51/307 |
| 4,164,680 | 8/1979 | Villalobos | 313/336 |
| 4,168,213 | 9/1979 | Hoeberechts | 437/250 |
| 4,924,131 | 5/1990 | Nakayama et al. | 310/329 |
| 4,990,766 | 2/1991 | Simms et al. | 250/214 TV |

(List continued on next page.)

FOREIGN PATENT DOCUMENTS

| | | |
|---|---|---|
| 0 512 129 A1 | 11/1992 | European Pat. Off. . |
| 2 260 641 | 4/1993 | United Kingdom . |

OTHER PUBLICATIONS

Hofer et al., *High Average Power Switching in Diamond*, UCRL-JC-109612 Preprint, 1992 Twentieth International Power Modulator Symposium, Jun. 23–25, 1992, pp. 241–244.

Geis et al., *Capacitance–Voltage Measurements on Metal–$SiO_2$–Diamond Structures Fabricated with (100)-and (111)-Oriented Substrate*, IEEE Transactions on Electron Devices, vol. 38, No. 3, Mar. 1991, pp. 619–626.

(List continued on next page.)

*Primary Examiner*—Christine K. Oda
*Attorney, Agent, or Firm*—Bell, Seltzer, Park & Gibson

[57] ABSTRACT

An acceleration sensor includes an acceleration mass and a substrate mounted so that a cavity is defined therebetween and so that the acceleration mass moves relative to the substrate when an acceleration of the sensor changes. The sensor also includes a diamond field emitter for generating an electron beam through the cavity between the acceleration mass and the substrate. Accordingly, the distance between the acceleration mass and the substrate affects the current of the electron beam which is measured to determine the acceleration of the sensor. The sensor may alternately include an annular extraction electrode in a cavity between a substrate and a collector together with a diamond field emitter for generating an electron beam which passes through the annular extraction electrode. The annular extraction electrode is moveable relative to the substrate in response to changes in an acceleration acting on the sensor. Accordingly, the electron beam current changes as the annular extraction electrode moves, and the current can be measured to determine the acceleration acting on the sensor.

52 Claims, 6 Drawing Sheets

U.S. PATENT DOCUMENTS

| | | | |
|---|---|---|---|
| 4,993,033 | 2/1991 | Lin | 372/30 |
| 5,030,921 | 7/1991 | Kane | 330/70 |
| 5,129,850 | 7/1992 | Kane et al. | 445/24 |
| 5,138,237 | 8/1992 | Kane et al. | 315/349 |
| 5,141,460 | 8/1992 | Jaskie et al. | 445/24 |
| 5,163,328 | 11/1992 | Holland | 73/723 |
| 5,180,951 | 1/1993 | Dworsky et al. | 315/169.3 |
| 5,199,918 | 4/1993 | Kumar | 455/50 |
| 5,202,571 | 4/1993 | Hirabayashi et al. | 257/10 |
| 5,252,833 | 10/1993 | Kane et al. | 250/423 F |
| 5,258,685 | 11/1993 | Jaskie et al. | 313/309 |
| 5,268,648 | 12/1993 | Calcatera | 330/3 |
| 5,278,475 | 1/1994 | Jaskie et al. | 315/169.3 |
| 5,283,501 | 2/1994 | Zhu et al. | 315/169.3 |
| 5,285,084 | 2/1994 | von Windheim et al. | 257/77 |
| 5,289,086 | 2/1994 | Kane | 315/349 |
| 5,290,102 | 3/1994 | Kaiser | 73/753 |
| 5,290,610 | 3/1994 | Kane et al. | 427/577 |
| 5,303,594 | 4/1994 | Kurtz et al. | 73/727 |
| 5,355,093 | 10/1994 | Treado et al. | 330/45 |
| 5,355,380 | 10/1994 | Lin et al. | 372/5 |
| 5,361,635 | 11/1994 | Woodruff | 73/514.18 |
| 5,424,241 | 6/1995 | Aslam | 313/352 |
| 5,495,143 | 2/1996 | Lengyel | 313/309 |

OTHER PUBLICATIONS

Geis et al., *Diamond Cold Cathodes*, Applications of Diamond Films and Related Materials, Elsevier Science Publishers B.V., 1991, pp. 309–310. (No Month).

Geis et al., *Device Quality Diamond Substrates*, Diamond and Related Materials, vol. 1, pp.684–687 (1992). (No Month).

Grot et al., *The Effect of Surface Treatment on the Electrical Properties of Metal Contacts to Boron–DOped Homoepitaxial Diamond Film*, IEEE Electron Device Letters, vol. 11, No. 2 Feb. (1990), pp. 100–102.

Shiomi et al., *Electrical Characteristics of Metal Contacts to Boron–Doped Diamond Epitaxial Film*, Japan J. Appl. Physics, vol. 28, pp. 758–762 (1989). (No Month).

Inoue et al., *Selected–area deposition of diamond films*, J. Appl. Phys. 67:7329 Jun. (1990).

DIAMOND FIELD EMISSION ACCELERATION SENSOR

FIELD OF THE INVENTION

This invention relates to microelectronic sensors, and more particularly to microelectronic acceleration sensors.

BACKGROUND OF THE INVENTION

Acceleration sensors are used in commercial, industrial, and consumer environments. For example, a conventional piezo-electric acceleration sensor has a cantilever structure in which the piezo-electric device including a polymer piezo-electric element is supported by a supporting member in a cantilever fashion. When a force is applied to a weight mounted to the distal end of the piezo-electric device, strain is produced perpendicular to the polarization axis. This piezo-electric acceleration sensor may be disadvantageous in that when the polymer piezo-electric material is used as a diaphragm, the resonance frequency may become lower, and the frequency of oscillation acceleration may vary, thus varying the output of the sensor.

In U.S. Pat. No. 4,924,131 to Nakayama et al. entitled "Piezo-Electric Acceleration Sensor" there is disclosed a piezo-electric acceleration sensor including a piezo-electric polymer membrane element having an element through-hole. A diaphragm has a diaphragm through-hole and is attached to the piezo-electric membrane element so that the diaphragm hole is concentric to the element through-hole to form a laminate with a laminate through-hole. A fixing mechanism, having a sensing hole, fixes the laminate in a stretched manner, and the laminate through-hole has about 2.25 to 80% of the area of the sensing hole.

The above mentioned sensors, however, may not be capable of operating at high temperatures, and may also be sensitive to temperature variations. Accordingly, there continues to exist a need in the art for a microelectronic acceleration sensor which is capable of operating at high temperatures and which is relatively insensitive to changes in temperature.

SUMMARY OF THE INVENTION

It is therefore an object of the present invention to provide an improved acceleration sensor.

It is another object of the present invention to provide an acceleration sensor having a decreased sensitivity to temperature changes.

It is still another object of the present invention to provide an acceleration sensor capable of operating at high temperatures.

These and other objects are provided according to the present invention by an acceleration sensor having a diamond electron emitter for generating an electron beam along an electron beam path and an acceleration mass which moves in response to an acceleration of the sensor. The movement of the acceleration mass changes the length of the electron beam path thereby causing changes in the electron beam current which can be measured. The field emission based acceleration sensor is therefore relatively insensitive to changes in temperature, and the diamond emitter element can withstand operation at relatively high temperatures. In addition, the emission characteristics of the diamond emitter element allow the sensor to operate at relatively low voltages. This acceleration sensor is also capable of operating in a DC mode reducing the complexity of the support circuitry.

According to one aspect of the present invention, an acceleration sensor includes a substrate and an acceleration mass positioned opposite the substrate. The acceleration mass and the substrate define a cavity therebetween, and the acceleration mass is mounted so as to be moveable relative to the substrate such that an acceleration of the sensor results in a change in a distance between the acceleration mass and the substrate. The sensor also includes a field emitter for generating an electron beam between the substrate and the acceleration mass, and this field emitter includes at least one diamond emitter element positioned in the cavity.

Accordingly, a change in the distance between the acceleration mass and the substrate results in a change in a current of the electron beam. The current of the electron beam can be measured in order to determine the acceleration of the sensor. This acceleration sensor is therefore relatively insensitive to changes in temperature and can be operated in a DC mode. The diamond emitter element can be operated at high temperatures and also resists corrosion. In addition, the diamond emitter element can generate an electron beam at relatively low voltages because of diamond's low electron affinity.

The diamond emitter element may include a first diamond layer having a first dopant type and a second diamond layer having a second dopant type thereby defining a junction. The first diamond layer is preferably adapted for injecting electrons into the second layer which is preferably adapted for emitting the electrons into the cavity. Accordingly, this diamond field emitter element can emit electrons at a relatively low voltage and can be fabricated using conventional microelectronic processing techniques. Alternately, the diamond emitter element may include a raised emitter tip having a diamond coated surface. The raised emitter tip increases the electron beam current by enhancing the electric field at the tip.

The diamond emitter element may be positioned on the acceleration mass adjacent the substrate, or alternately on the substrate adjacent the acceleration mass. In addition, the acceleration sensor may include an extraction electrode positioned between the substrate and the acceleration mass. A very sensitive sensor can be obtained by including both an extraction electrode and a diamond emitter element on the acceleration mass. In this arrangement, the diamond emitter element moves relative to both the substrate and the extraction electrode increasing the effect of acceleration mass movement on the electron beam current.

The acceleration mass is preferably mounted using a support member on the acceleration mass and a dielectric stand-off positioned around the cavity between the substrate and the support member. The support member can be flexible and the stand-off can be rigid. Alternately, the support member can be rigid and the stand-off can be flexible.

The cavity between the substrate and the acceleration mass can be evacuated thereby reducing the voltage required to generate the electron beam. The acceleration sensor may also include a power supply for providing an electrical potential between the substrate and the acceleration mass and measurement means for measuring the electron beam current. The sensor can also include an array of diamond emitter elements. The array may provide a larger summed electron beam current which can be easier to measure, or individual electron beam currents from individual emitter elements can be measured separately to determine the displacement of individual points of the acceleration mass.

Alternately, the acceleration sensor may include a diamond field emitter element for emitting an electron beam along an electron beam path, a collector, and an annular extraction electrode. The collector is positioned adjacent the diamond field emitter and in the electron beam path, and defines a cavity between it and the diamond field emitter. The annular extraction electrode is positioned between the diamond field emitter and the collector, and defines an opening through which the electron beam path passes. The annular extraction electrode is mounted so as to be moveable relative to the diamond field emitter such that an acceleration of the sensor results in a change in a distance between the extraction electrode and the diamond field emitter. This change in the distance results in a change in a current of the electron beam which can be measured to determine the acceleration of the sensor. In this acceleration sensor, the moving acceleration sensitive elements are internal and therefor protected.

The annular extraction electrode is preferable mounted on at least one cantilever beam connected to the annular extraction electrode. In addition, first and second dielectric stand-off layers can be used to mount the elements of the sensor. The first dielectric layer is preferably positioned between the collector and the extraction electrode around the cavity, and the second dielectric layer is preferably positioned between the extraction electrode and the diamond emitter element around the cavity.

Accordingly, the acceleration sensor of the present invention is robust and can operate at relatively high temperatures. This sensor is also relatively insensitive to temperature changes and can be fabricated using known microelectronic processing techniques.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 1:
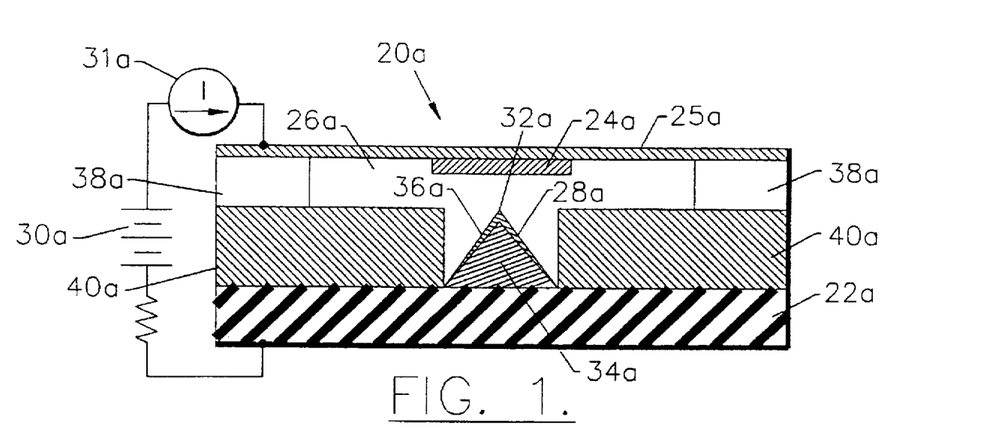
FIG. 1 is a cross-sectional side view of a diamond acceleration sensor including a raised diamond field emitter tip opposite the acceleration mass according to the present invention.

The acceleration sensor 20a of FIG. 1 includes a substrate 22a and an acceleration mass 24a which is mounted so as to be moveable relative to the substrate 22a and to define a cavity 26a therebetween. Accordingly, the acceleration mass 24a will move relative to the substrate 22a if the sensor 20a is accelerated. The acceleration sensor 20a also includes means for generating an electron beam between the substrate 22a and the acceleration mass 24a, and this means includes a diamond field emitter element 28a positioned in the cavity 26a.

As shown in FIG. 1, the diamond field emitter element 28a can be positioned in the cavity 26a on the substrate 22a defining an electron beam path from the diamond field emitter element 28a through the cavity 26a to the acceleration mass 24a. As will be understood by those having skill in the art, the term substrate may be defined so as to include the diamond field emitter element. An electrical bias (or potential) applied by the power supply 30a initiates the electron beam. The length of the electron beam path changes as the acceleration mass 24a moves in response to an acceleration of the sensor 20a, thereby changing the electric field between the diamond field emitter element 28a and the acceleration mass 24a. These changes in the electric field result in corresponding changes in the electron beam current which can be measured by the current meter 31a in order to determine the position of the acceleration mass 24a. The position of the acceleration mass 24a in turn corresponds to the acceleration of the sensor.

The diamond field emitter element 28a can include a raised emitter tip 32a having a sharp tip geometry. This sharp tip geometry increases the electric field at the tip 32a thereby enhancing the field emission characteristics of the field emitter element and lowering the voltage required to generate an electron beam. This raised emitter tip 32a can be a needle, cone, pyramid, knife edge, or other structure having a relatively sharp geometry. The emitter element can be formed by coating a base structure 34a having the appropriate shape with a thin layer of diamond 36a. Such a structure can be formed as disclosed, for example, in U.S. Pat. No. 5,141,460 to Jaskie et al. entitled "Method of Making a Field Emission Electrode Source Employing a Diamond Coating", and U.S. Pat. No. 5,258,685 to Jaskie et al. entitled "Field Emission Electron Source Employing a Diamond Coating". The emitter can also have a solid diamond structure as disclosed, for example, in U.S. Pat. No. 5,199,918 to Kumar entitled "Method of Forming Field Emitter Device With Diamond Emission Tips". Each of the above mentioned patents is hereby incorporated in its entirety herein by reference.

The acceleration mass 24a is preferably supported on a flexible support member 25a, and the support member 25a is mounted on a rigid stand-off which can include two layers 38a and 40a positioned around the cavity 26a between the support member 25a and the substrate 22a. The flexible support member 25a can be a thin continuous layer (or diaphragm) thereby providing a durable sensor structure.

The flexible support member can alternately comprise one or more cantilever beams thereby providing increased sensitivity to relatively small accelerations.

As shown, the two layer stand-off structure allows increased sensitivity while protecting against over-acceleration situations. The first layer 38a provides a sufficiently wide portion of the cavity 26a so that the support member 25a can flex in response to accelerations which cause the acceleration mass 24a to move relative to the substrate 22a. The second layer 40a of this stand-off structure can have a relatively narrow opening to prevent the acceleration mass from contacting the diamond field emitter element during over-acceleration situations. Accordingly, the narrow opening acts as an over-acceleration stop. This rigid stand-off structure preferably comprises a dielectric material such as silicon dioxide, silicon nitride, intrinsic diamond, or other dielectric materials known to those having skill in the art. By using intrinsic diamond, the entire acceleration sensor, including the substrate, field emitter element, stand-off structure, acceleration mass, and support member can be made from diamond thereby providing a robust sensor which can be easily manufactured.

Alternately, the support member 25a can be rigid, and mounted on a flexible stand-off structure which can include layers 38a and 40a positioned around the cavity between the support member 25a and the substrate 22a. This stand-off structure preferably comprises a relatively elastic material which expands and contracts as the sensor accelerates allowing the acceleration mass to move relative to the substrate. In yet another alternative, both the support member 25a and the stand-off structure can be flexible.

The support member 25a is preferably a thin continuous flexible layer of diamond. The use of a diamond support member 25a allows the acceleration sensor 20a to operate in a corrosive environment, as well as at high temperatures. Doped portions of the support member 25a can be provided in order to allow electrical energy to flow between the electron beam and the power supply 30a. In addition, the substrate 22a is preferably conductive to allow electrical energy to flow between the power supply 30a and the diamond field emitter element 28a. Alternately, conductive layers can be provided on one or both of the support member 25a and the substrate 22a to allow the flow of electrical energy.

The use of diamond for the field emitter element has the advantage that diamond can withstand high temperatures allowing high temperature processing during manufacture as well as high temperature operation. The diamond field emitter element is also robust due to the physical hardness of diamond and its high resistance to corrosion. In addition, diamond has a relatively low electron affinity thereby allowing electron emission at relatively low voltages as discussed, for example, in U.S. Pat. No. 5,283,501 to Zhu et al. entitled "Electron Device Employing A Low/Negative Electron Affinity Electron Source", the disclosure of which is hereby incorporated in its entirety herein by reference. While it is preferred that the cavity 26a is evacuated in order to reduce the voltage required to generate the electron beam, this is not necessary because of diamond's low electron affinity.

Figure 2:
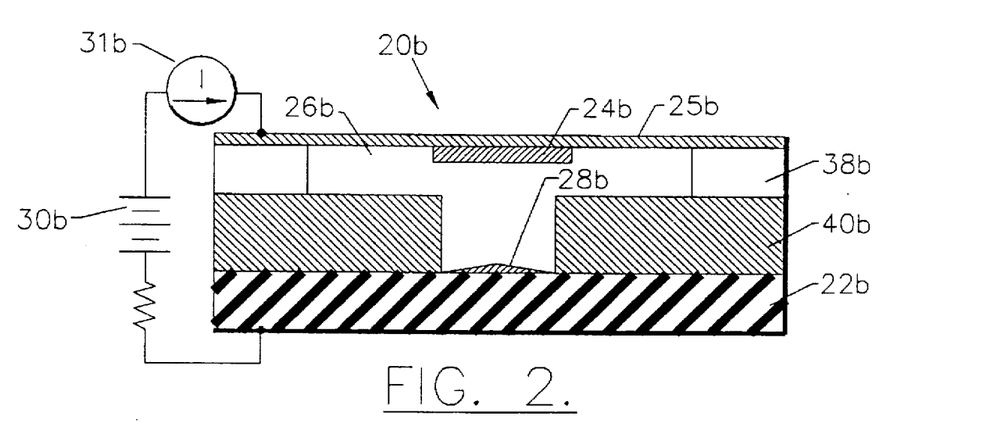
FIG. 2 is a cross-sectional side view of a diamond acceleration sensor including a relatively flat diamond field emitter opposite the acceleration mass according to the present invention.

Because of its low electron affinity, a diamond field emitter element 28b can have a relatively flat profile as illustrated in FIG. 2. This structure can have reduced manufacturing steps because of the elimination of the sharp tip. The relatively flat diamond field emitter element can have either a flat surface or a blunt tip as will be understood by those having skill in the art. In addition, a relatively flat emitter element 28b can include a first intrinsic or n-doped diamond layer on the substrate 22b and a second p-doped diamond layer on the first layer adjacent the acceleration mass (illustrated in greater detail in FIGS. 10 and 11). This bi-layer structure enhances the promotion of electrons from the first layer to the second layer. These electrons are then emitted from the second layer into the cavity. Accordingly, this structure can provide enhanced electron emission without requiring a sharp emitter tip.

Figure 3:
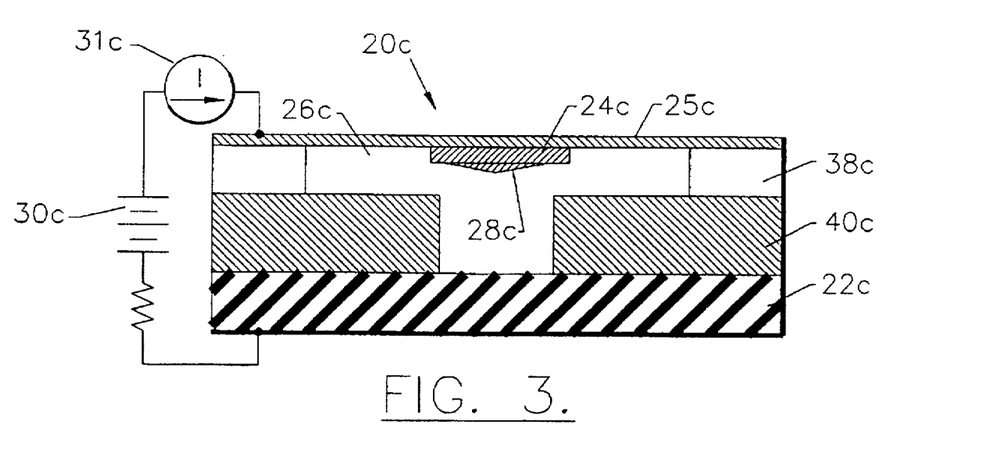
FIG. 3 is a cross-sectional side view of a diamond acceleration sensor including a relatively flat diamond field emitter on the acceleration mass according to the present invention.

Furthermore, the diamond emitter element 28c can be positioned on the acceleration mass 24c, as shown in FIG. 3. Accordingly, the diamond emitter element 28c moves together with the acceleration mass 24c relative to the substrate 22c, thereby changing the length of the electron beam path. This arrangement has the advantage that the diamond emitter element 28c can be fabricated integrally with a diamond acceleration mass 24c and support member 25c providing a robust acceleration mass and support member, as well as a field emitter element 28c with a relatively low electron affinity. The diamond support member, acceleration mass, and emitter element can then be bonded to a non-diamond stand-off structure including layers 38c and 40c on non-diamond substrate 22c, reducing the number of separate diamond elements to be produced. Alternately, the entire sensor can be formed from diamond. As will be understood by those having skill in the art, the term acceleration mass can be defined so as to include the diamond field emitter element.

Figures 10, 11:
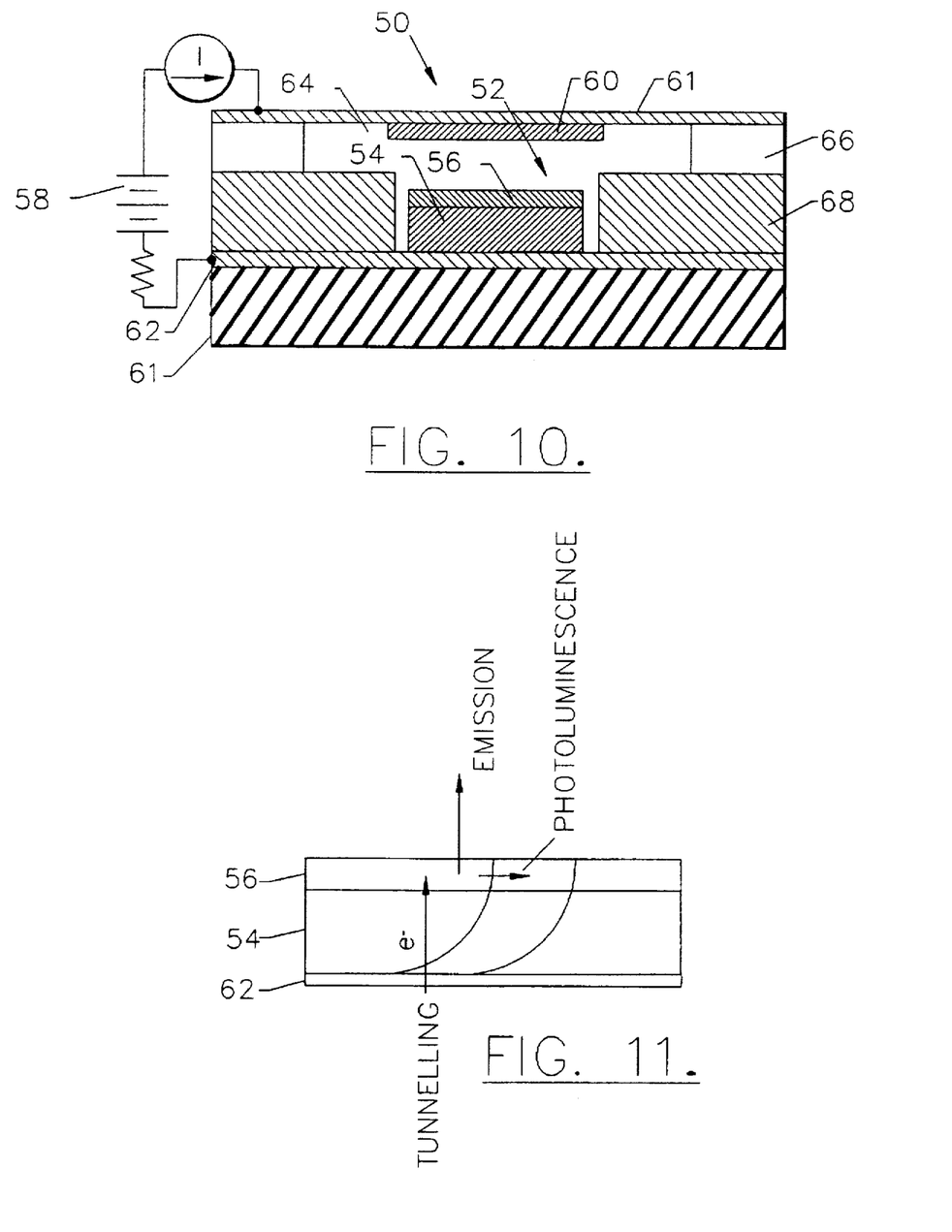
FIG. 10 is a greatly enlarged cross-sectional side view of an acceleration sensor including a relatively flat diamond emitter element having first and second dopant types according to the present invention.
FIG. 11 is an energy band diagram for the diamond emitter element of FIG. 10.

The relatively flat diamond emitter element 28c preferably includes a first layer of intrinsic or n-doped diamond on the acceleration mass and a second layer of p-doped diamond on the first layer opposite the acceleration mass. This diamond emitter structure is illustrated in FIG. 10. Alternately, the diamond emitter element 28c of FIG. 3 may comprise an emitter tip having a sharp tip geometry as shown in FIG. 1.

The diamond emitter element of FIGS. 1–3 can be monocrystalline diamond, highly oriented diamond, polycrystalline diamond, or nanocrystalline diamond. In addition, the diamond emitter element can be subjected to surface modification. For example, the surface of the diamond emitter element can be implanted with carbon, boron or other materials known to those having skill in the art; the surface can be etched; or the surface can be subjected to surface reconstruction to achieve a hydrogen terminated surface, an oxygen terminated surface, or carbon double bonds.

Figure 4:
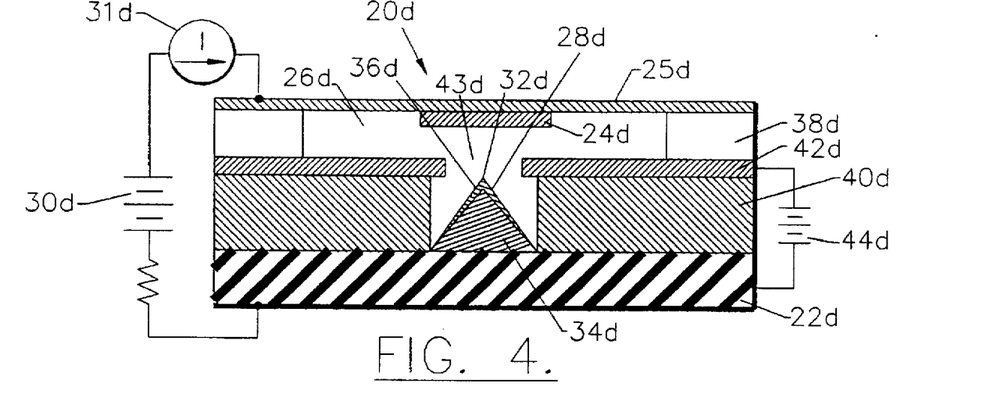
FIG. 4 is a cross-sectional side view of a diamond acceleration sensor including an extraction electrode and a raised diamond field emitter tip opposite the acceleration mass according to the present invention.

The diamond acceleration sensor 20d may comprise a triode structure as shown in FIG. 4. As before, the acceleration mass 24d moves relative to the substrate 22d in response to an acceleration of the sensor which causes the acceleration mass to move relative to the substrate. In the acceleration sensor of FIG. 4, however, an extraction electrode, or anode, 42d is provided between diamond emitter element 28d and the acceleration mass 24d. The extraction electrode 42d is preferably a conductive layer positioned between layers 38d and 40d of the stand-off structure. As before, a first power supply 30d provides an electrical bias between the diamond emitter element 28d and the acceleration mass 24d. In the triode structure an additional power supply 44d provides an independent electrical bias between the extraction electrode 42d and the diamond emitter element 28d. Accordingly, the extraction electrode 42d draws electrons from the diamond emitter element 28d which are then accelerated along the electron beam path to the acceleration mass 24d.

The extraction electrode 42d comprises a conductive layer defining a passage 43d in the cavity 26d through which the electron beam travels. The extraction electrode 42d can be a metal layer, or a degeneratively doped diamond layer. In addition, the layers 38d and 40d are preferably dielectric layers to provide electrical isolation between the diamond emitter element 28d, the extraction electrode 42d, and the acceleration mass 24d. As before, these layers may comprise a dielectric material such as silicon dioxide, silicon nitride, intrinsic diamond, or other dielectric materials known to those having skill in the art. Accordingly, the acceleration sensor of FIG. 4 including the substrate 22d, the diamond emitter element 28d, the stand-off structure layers 40d and 38d, the extraction electrode 42d, the acceleration mass 24d and the support member 25d, can be fabricated from diamond thereby simplifying the fabrication process.

Figure 5:
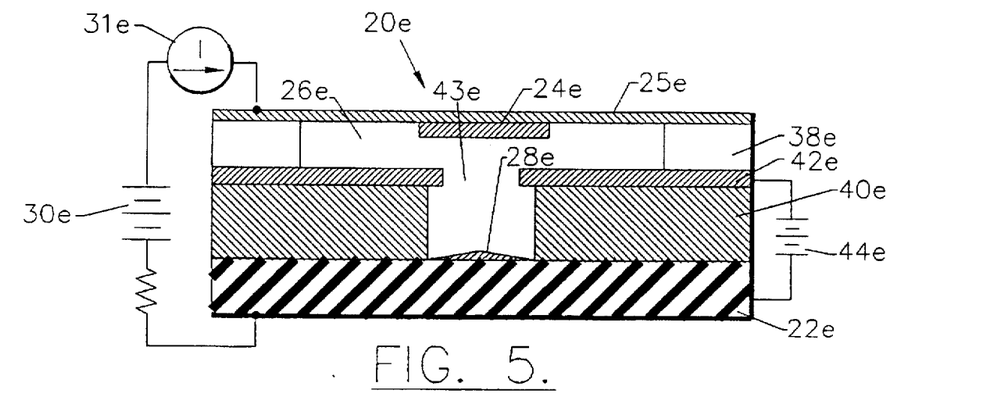
FIG. 5 is a cross-sectional side view of a diamond acceleration sensor including an extraction electrode and a relatively flat diamond field emitter opposite the acceleration mass according to the present invention.

An acceleration sensor 20e having a triode structure can have a diamond field emitter element 28e with a relatively flat profile, as shown in FIG. 5. As discussed above with regard to FIG. 2, the relatively flat diamond field emitter element 28e can have either a flat surface or a blunt tip. In addition, a relatively flat emitter element can include a first intrinsic or n-doped diamond layer on the substrate 22e and a second p-doped diamond layer on the first layer adjacent the acceleration mass 24e (illustrated in greater detail in FIGS. 10 and 11).

Figure 6:
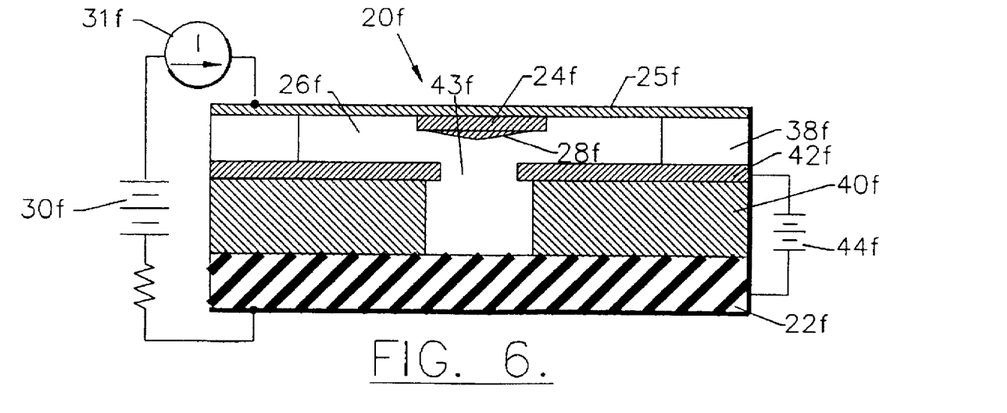
FIG. 6 is a cross-sectional side view of a diamond acceleration sensor including an extraction electrode and a relatively flat diamond field emitter on the acceleration mass according to the present invention.

An acceleration sensor 20f having a triode structure can have a diamond emitter element 28f positioned on the acceleration mass 24f, as shown in FIG. 6. Accordingly, the diamond field emitter element 28f moves together with the acceleration mass 24f relative to both the substrate 22f and the extraction electrode 42f. This arrangement provides greater control and sensitivity for the acceleration sensor 20f because both the length of the electron beam path from the diamond field emitter element 28f to the substrate 22f, and the distance between the diamond field emitter element 28f and the extraction electrode 42f change as the acceleration mass 24f moves. While acceleration sensor 20f is shown with a relatively flat diamond field emitter element 28f, a diamond field emitter element having a sharp tip geometry can alternately be provided on the acceleration mass 24f thereby enhancing the emission characteristics of the diamond field emitter element. The diamond field emitter element 28f may alternately include a first intrinsic or n-doped diamond layer on the acceleration mass 24f and a second p-doped diamond layer on the first layer adjacent the substrate 22f.

Figure 7:
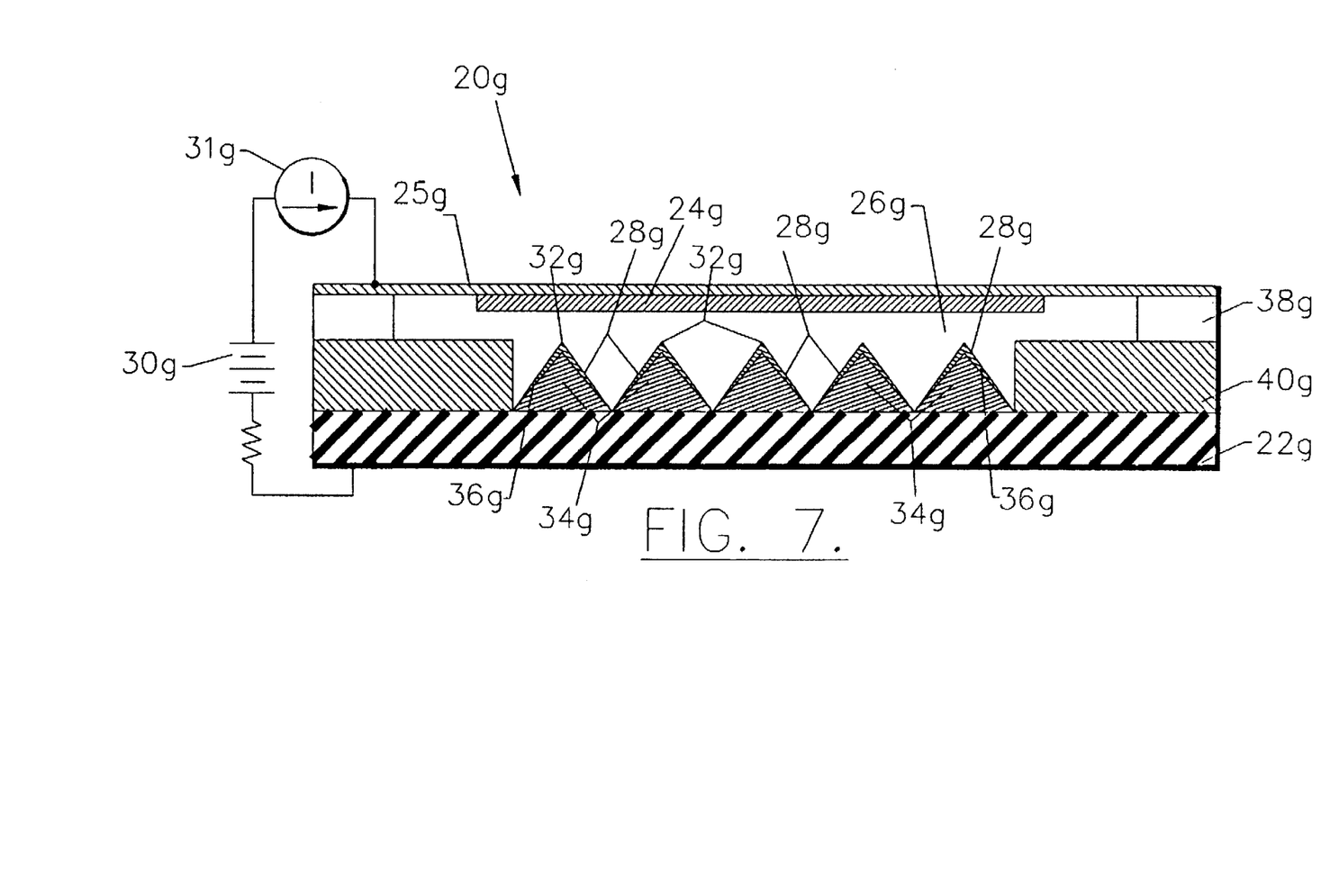
FIG. 7 is a cross-sectional side view of a diamond acceleration sensor including an array of raised diamond field emitter tips opposite the acceleration mass according to the present invention.

An acceleration sensor 20g includes an array of diamond field emitter elements 28g in the cavity 26g between the acceleration mass 24g and the substrate 22g for generating a plurality of electron beams. Accordingly, the array of emitter elements can generate a greater summed electron beam current than a single diamond field emitter element, and this larger current can be easier to measure with the current meter 31g. Alternately, each of the electron beams from each of the diamond field emitter elements 28g can be measured individually thereby providing measurements of acceleration mass 24g displacement at a plurality of discrete points. Accordingly, localized displacements of the acceleration mass 24g can be individually measured. While FIG. 7 shows diamond field emitter elements 28g having relatively sharp tip geometries, the acceleration sensor 20g can alternately have a plurality of diamond field emitter elements having relatively flat profiles. Furthermore, the plurality of diamond field emitter elements 28g can be located on the acceleration mass 24g instead of the substrate 22g.

Figure 8:
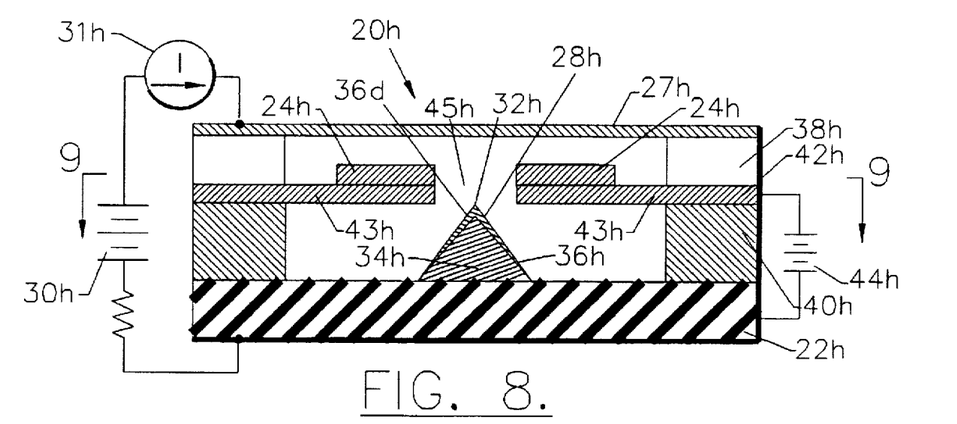
FIG. 8 is a cross-sectional side view of a diamond acceleration sensor including a diamond field emitter, an annular extraction electrode, and a collector according to the present invention.

An acceleration sensor 20h can include a diamond field emitter element 28h on substrate 22h adjacent a collector layer 27h, as shown in FIG. 8. This sensor 20h also includes an extraction electrode 42h, or anode, including two cantilever beams 43h supporting an acceleration mass 24h. An electron beam path from the raised emitter tip 32h to the collector layer 27h passes through an opening 45h in the acceleration mass 24h. Accordingly, power supply 44h generates an electrical potential between the diamond field emitter element 28h and the acceleration mass 24h portion of the extraction electrode 42h thereby extracting electrons from the field emitter element. Power supply 30h generates an electrical potential between the diamond field emitter element 28h and the collector layer 27h thereby accelerating the extracted electrons toward the collector layer 27h.

Figure 9:
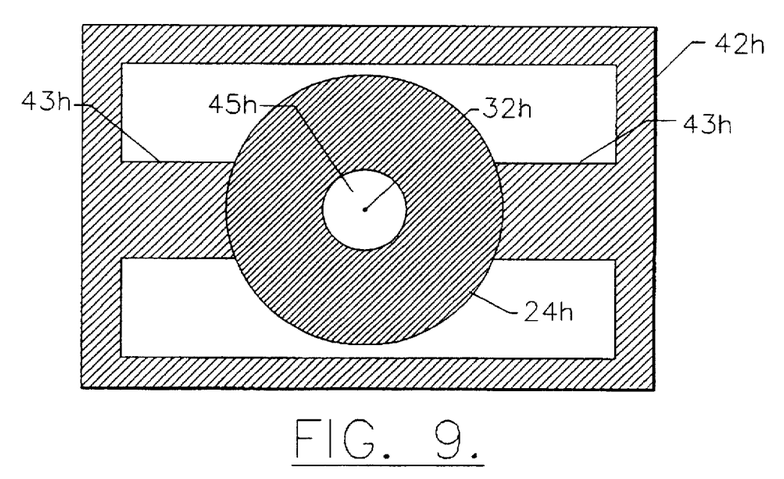
FIG. 9 is a cross-sectional top view of a diamond acceleration sensor taken along section line 9 of FIG. 8.

The acceleration mass 24h, which is a part of the extraction electrode 42h moves relative to the diamond field emitter element 28h in response to an acceleration of the sensor 20h. The distance from the acceleration mass 24h to the diamond field emitter element determines the quantity of electrons extracted from the emitter element which then accelerate toward the collector layer 27h. Accordingly the current measured by the current meter 31h changes as the sensor 20h accelerates, and this current measurement can be used to determine the acceleration of the sensor. As shown in FIG. 9, two cantilever beams support the acceleration mass 24h while allowing it to move in response to sensor accelerations. Alternatively, a thin flexible layer, or diaphragm, can be used to support the acceleration mass.

This sensor 20h can be very sensitive to accelerations because the acceleration mass 24h can be placed very close to the emitter element. Accordingly, small changes in the position of the acceleration mass can cause relatively large changes in the electron beam current. The acceleration mass and supporting beams (or diaphragm) are internal, and the collector layer is preferably stiff. Accordingly, the sensor 20h is robust because all moving parts are internal and therefor not exposed, and the collector layer can be relatively thick and therefore stiff. Because the external surfaces of this sensor 20h are stiff, it is insensitive to external forces and pressures other than those that result in accelerations.

As will be understood by those having skill in the art, the acceleration sensor 20h of FIGS. 8 and 9 can have the diamond emitter element 28h on the layer opposite the substrate wherein the substrate acts as the collector. In addition, the diamond field emitter element can have a raised emitter tip 32h as shown or a relatively flat emitter element as discussed above with regard to FIGS. 2 and 5. The relatively flat emitter tip can include a first layer having a first dopant type and a second layer having a second dopant type as discussed with regard to FIGS. 10–12.

Alternatively, the opening 45h in the acceleration mass 24h can be eliminated so that the acceleration mass 24h serves as the collector. The substrate 22h layer and opposing layer 27h together with stand-off layers 38h and 40h make up a sensor body defining a cavity therein. In this example, the acceleration mass 24h moves within the cavity protected from external factors, and power supply 30h can be eliminated. As before, the acceleration mass can be supported on a pair of cantilever beams 43h or alternatively a diaphragm. By evacuating the cavity, pressure differentials will not have a significant effect on the movement of the acceleration mass.

An acceleration sensor 50 can include a flat diamond field emitter element 52 having a first diamond layer 54 on the substrate 58 and a second diamond layer 56 on the first diamond layer opposite the substrate. The power supply 58 provides an electrical bias between the acceleration mass and the diamond field emitter element 52. The acceleration mass 60 and support member 61 are preferably diamond including doped portions so that electrical energy can flow therethrough. The acceleration mass and support member may alternately be another conductive material or include conductive portions to facilitate the flow of electrical energy. The substrate 61 preferably includes a conductive layer 62 to provide an electrical connection from the power supply 58 to the diamond field emitter element 52. If the substrate 61 is a semiconductor substrate, the conductive layer 62 can be a doped portion thereof. Alternately, the conductive layer 62 can be a metal layer, or the entire substrate 61 can be conductive.

In the diamond field emitter element 52 of FIG. 10, the first diamond layer 54 is preferably an intrinsic or n-doped layer which acts as an injecting contact. The second diamond layer 56 is preferably a p-doped over-layer which emits electrons into the cavity 64. Accordingly, the first layer 54 injects electrons from the conductive layer 62 into the second layer 56 which emits the electrons into the cavity 64 thereby generating an electron beam which impinges the acceleration mass 60. The energy required for this process is provided by the power supply 58 which generates an electric field between the substrate 61 and the acceleration mass 60.

A band diagram for the diamond field emitter element 52 of FIG. 10 is shown in FIG. 11. Electrons from the conductive layer 62 tunnel through the first layer 54, which is either intrinsic or n-doped diamond, to the second layer 56 which is p-doped. Most of these electrons are emitted from the p-doped diamond layer 56 into the cavity. In addition, some of these electrons may result in photoluminescence.

Figure 12:
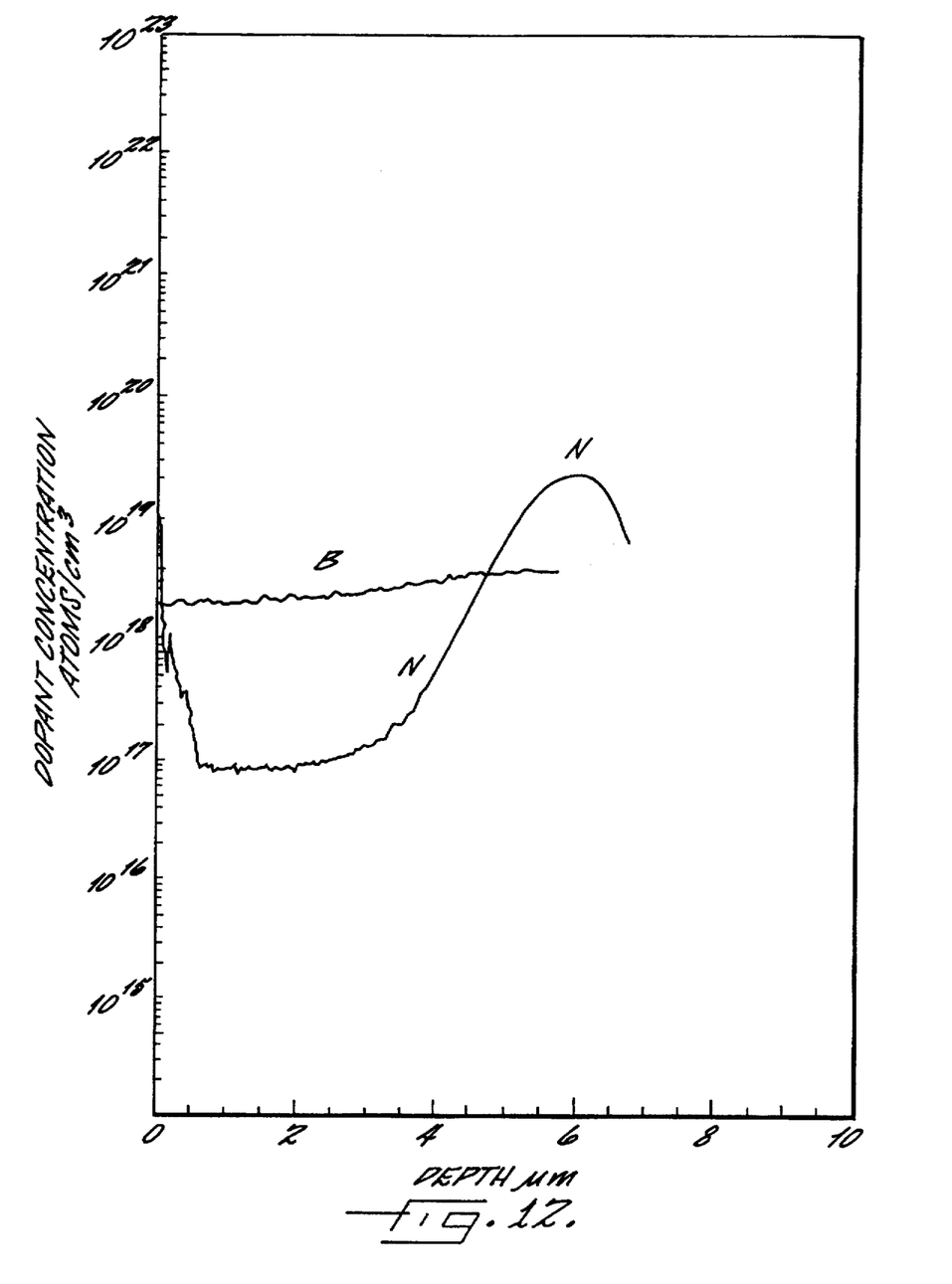
FIG. 12 is a profile of the dopant concentration as a function of depth for the diamond emitter element of FIG. 10.

A dopant profile of the two layer diamond field emitter element 52 is shown in FIG. 12. The concentration of boron remains relatively constant (approximately $2 \times 10^{18}$ atoms per $cm^3$) as a function of depth into the diamond structure. The concentration of nitrogen is relatively low (approximately $1 \times 10^{17}$ atoms per $cm^3$) near the emission surface of the structure, but this concentration increases as a function of depth to about $2 \times 10^{19}$ atoms per $cm^3$ at a depth of about 6 µm. Accordingly, this diamond field emitter element can be made using known fabrication techniques. This structure has the advantage that an electron beam can be generated with a relatively low voltage without requiring a sharp tip geometry. As previously discussed, the diamond emitter element can be formed from monocrystalline diamond, highly oriented diamond, polycrystalline diamond, or nanocrystalline diamond, and the surface can be subject to surface reconstruction.

As before, the acceleration mass 60 is movably mounted relative to the substrate 61 in the acceleration sensor 50 of FIG. 10. The acceleration mass 60 is shown mounted on a support member 61 which is preferably a thin layer of diamond supported by a stand-off structure which may include two layers 66 and 68 surrounding the cavity 64. Each of these layers is preferably formed from a dielectric material which can be intrinsic diamond. Stand-off layer 66 preferably provides a sufficiently wide opening under the support member so that the support member can flex, while stand-off layer 68 provides a relatively narrow opening which can act as an over-acceleration stop. Alternately, the stand-off structure can comprise a relatively elastic material allowing the entire support member and acceleration mass to move toward and away from the substrate.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An acceleration sensor comprising:
    diamond field emission means for emitting an electron beam along an electron beam path, said diamond field emission means comprising at least one diamond emitter element;
    an acceleration mass positioned adjacent said diamond field emission means; and
    mounting means for mounting said acceleration mass so as to be moveable relative to said field emission means such that a change in acceleration of said sensor results in a change in a distance between said acceleration mass and said field emission means thereby changing a current of said electron beam; and
    an extraction electrode positioned between said field emission means and said acceleration mass.

2. An acceleration sensor according to claim 1 wherein said diamond field emission means comprises a first diamond layer having a first conductivity type and a second diamond layer having a second conductivity type thereby defining a junction.

3. An acceleration sensor according to claim 1 wherein said diamond field emission means comprises a raised emitter tip having a diamond coated surface.

4. An acceleration sensor according to claim 1 wherein said mounting means comprises a flexible support member on said acceleration mass, and a rigid stand-off defining a cavity between said support member and said at least one diamond emitter element.

5. An acceleration sensor according to claim 1 wherein said mounting means comprises a rigid support member on said acceleration mass, and a flexible stand-off defining a cavity between said support member and said diamond field emission means.

6. An acceleration sensor according to claim 1 wherein said mounting means comprises:
    a support member connected to said acceleration mass;
    a substrate on said field emitter element; and
    a dielectric stand-off defining a cavity and connecting said substrate and said support member.

7. An acceleration sensor according to claim 6 wherein said cavity is evacuated.

8. An acceleration sensor according to claim 1 further comprising:
    electrical biasing means for providing an electrical potential between said at least one diamond emitter element and said acceleration mass; and
    measurement means for measuring said electron beam current.

9. An acceleration sensor according to claim 1 wherein said field emission means comprises an array of diamond emitter elements.

10. An acceleration sensor comprising:
    a substrate:
    an acceleration mass positioned opposite said substrate;
    mounting means for mounting said acceleration mass so as to be moveable relative to said substrate and defining a cavity therebetween such that a change in an acceleration of said sensor results in a change in a distance between said acceleration mass and said substrate;
    diamond field emission means for generating an electron beam between said substrate and said acceleration mass, said diamond field emission means comprising at least one diamond emitter element positioned in said cavity, wherein a change in said distance between said acceleration mass and said substrate results in a change in a current of said electron beam; and
    an extraction electrode positioned between said substrate and said acceleration mass.

11. An acceleration sensor according to claim 10 wherein said diamond field emission means comprises a first diamond layer having a first conductivity type and a second diamond layer having a second conductivity type thereby defining a junction.

12. An acceleration sensor according to claim 10 wherein said diamond field emission means comprises a raised emitter tip having a diamond coated surface.

13. An acceleration sensor according to claim 10 wherein said mounting means comprises a flexible support member on said acceleration mass and a rigid stand-off positioned around said cavity between said support member and said substrate.

14. An acceleration sensor according to claim 10 wherein said mounting means comprises a rigid support member on said acceleration mass and a flexible stand-off positioned around said cavity between said support member and said substrate.

15. An acceleration sensor according to claim 10 wherein said mounting means comprises a support member on said acceleration mass and a dielectric stand-off positioned around said cavity between said substrate and said support member.

16. An acceleration sensor according to claim 10 wherein said cavity is evacuated.

17. An acceleration sensor according to claim 10 further comprising:
    electrical biasing means for providing an electrical potential between said substrate and said acceleration mass; and
    measurement means for measuring said electron beam current.

18. An acceleration sensor according to claim 10 wherein said diamond field emission means comprises an array of diamond emitter elements.

19. An acceleration sensor according to claim 10 wherein said diamond emitter element is positioned on said acceleration mass adjacent said substrate.

20. An acceleration sensor according to claim 10 wherein said at least one diamond emitter element is positioned on said substrate adjacent said acceleration mass.

21. An acceleration sensor comprising:
    diamond field emission means for emitting an electron beam along an electron beam path, said diamond field emission means comprising at least one diamond emitter element;
    a collector positioned adjacent said diamond field emission means and in said electron beam path, said collector and said at least one diamond emitter element defining a cavity therebetween;
    an annular extraction electrode positioned between said diamond field emission means and said collector, said annular extraction electrode defining an opening through which said electron beam path passes;
    mounting means for mounting said annular extraction electrode so as to be moveable relative to said at least one diamond emitter element such that an acceleration of said sensor results in a change in a distance between said extraction electrode and said at least one diamond emitter element, and said change in said distance results in a change in a current of said electron beam.

22. An acceleration sensor according to claim 21 wherein said mounting means comprises at least one cantilever beam connected to said annular extraction electrode.

23. An acceleration sensor according to claim 21 wherein said mounting means comprises first and second dielectric stand-off layers, said first dielectric layer positioned between said collector and said extraction electrode around said cavity, and said second dielectric layer positioned between said extraction electrode and said at least one diamond emitter element around said cavity.

24. An acceleration sensor according to claim 21 wherein said collector comprises a stiff conductive layer.

25. An acceleration sensor according to claim 21 wherein said diamond field emission means comprises a first diamond layer having a first conductivity and a second diamond layer having a second conductivity thereby defining a junction.

26. An acceleration sensor according to claim 21 wherein said at least one diamond emitter element comprises at least one raised emitter tip having a diamond coated surface.

27. An acceleration sensor according to claim 21 wherein said cavity is evacuated.

28. A acceleration sensor according to claim 21 further comprising:
    first electrical biasing means for providing a first electrical potential between said at least one diamond emitter element and said annular extraction electrode;
    second electrical biasing means for providing a second electrical potential between said at least one diamond emitter element and said collector; and
    measurement means for measuring said electron beam current.

29. An acceleration sensor comprising:
    a sensor body including a pair of opposing layers defining a cavity therebetween;
    field emission means in said cavity for emitting an electron beam along an electron beam path, said field emission means comprising at least one emitter element;
    an acceleration mass in said cavity, said acceleration mass being moveable relative to said pair of opposing layers in response to acceleration of said acceleration sensor; and
    mounting means for mounting said acceleration mass in said cavity such that movement thereof changes a current of said electron beam;
    wherein said at least one emitter element is positioned on a first one of said layers and a second one of said layers comprises a collector such that said electron beam path extends from said emitter element to said collector, and wherein said acceleration mass comprises an annular extraction electrode positioned in said cavity and defines an opening through which said electron beam path passes.

30. An acceleration sensor according to claim 29 wherein said mounting means comprises at least one cantilever beam connected to said acceleration mass.

31. An acceleration sensor according to claim 29 wherein said at least one emitter element comprises at least one diamond emitter element.

32. An acceleration sensor according to claim 29 wherein said acceleration mass is positioned between said layers such that a change in an acceleration of said sensor results in a change in a distance between said acceleration mass and said pair of layers, and, wherein said at least one emitter element is on said acceleration mass adjacent one of said layers for emitting an electron beam toward said layer.

33. An acceleration sensor according to claim 29 further comprising an extraction electrode positioned between said field emission means and said acceleration mass.

34. An acceleration sensor comprising:
    diamond field emission means for emitting an electron beam along an electron beam path, said diamond field emission means comprising at least one diamond emitter element;
    an acceleration mass which is moveable relative to said acceleration sensor in response to acceleration of said acceleration sensor;
    mounting means for mounting said acceleration mass such that movement thereof changes a current of said electron beam; and
    an extraction electrode positioned between said field emission means and said acceleration mass.

35. An acceleration sensor according to claim 34 wherein said acceleration mass is positioned adjacent said diamond field emission means and in said electron beam path, and wherein said acceleration mass is moveable relative to said field emission means and defines a cavity therebetween such that a change in acceleration of said sensor results in a change in a distance between said acceleration mass and said field emission means thereby changing a current of said electron beam.

36. An acceleration sensor according to claim 34 further comprising a substrate wherein said acceleration mass is positioned opposite said substrate and mounted so as to be moveable relative to said substrate and defining a cavity therebetween such that a change in an acceleration of said sensor results in a change in a distance between said acceleration mass and said substrate, and wherein said at least one diamond emitter element is on said acceleration mass adjacent said substrate for emitting an electron beam toward said substrate.

37. An acceleration sensor according to claim 34 further comprising a collector positioned adjacent said diamond emitter element and in said electron beam path, said collector and said diamond emitter element defining a cavity therebetween wherein said acceleration mass comprises an annular extraction electrode positioned in said cavity and defining an opening through which said electron beam path passes.

38. An acceleration sensor according to claim 34 wherein said diamond emitter element comprises a first diamond layer having a first conductivity type and a second diamond layer having a second conductivity type thereby defining a junction.

39. An acceleration sensor according to claim 34 wherein said diamond field emission means comprises a raised emitter tip having a diamond coated surface.

40. An acceleration sensor according to claim 34 further comprising a substrate defining a cavity between said substrate and said acceleration mass wherein said mounting means comprises a flexible support member on said acceleration mass, and a rigid stand-off positioned around said cavity between said support member and said substrate.

41. An acceleration sensor according to claim 34 further comprising a substrate defining a cavity between said substrate and said acceleration mass wherein said mounting means comprises a rigid support member on said acceleration mass, and a flexible stand-off positioned around said cavity between said support member and said substrate.

42. An acceleration sensor according to claim 34 wherein said mounting means comprises:
  a support member connected to said acceleration mass;
  a substrate defining a cavity between said acceleration mass and said substrate; and
  a dielectric stand-off around said cavity connecting said substrate and said support member.

43. An acceleration sensor according to claim 42 wherein said cavity is evacuated.

44. An acceleration sensor according to claim 34 wherein said at least one diamond emitter element comprises an array of diamond emitter elements.

45. An acceleration sensor comprising:
  field emission means for emitting an electron beam along an electron beam path, said field emission means comprising at least one emitter element;
  a collector positioned adjacent said field emission means and in said electron beam path, said collector and said at least one emitter element defining a cavity therebetween;
  an annular extraction electrode positioned between said field emission means and said collector, said annular extraction electrode defining an opening through which said electron beam path passes;
  mounting means for mounting said annular extraction electrode so as to be moveable relative to said at least one emitter element such that an acceleration of said sensor results in a change in a distance between said extraction electrode and said at least one emitter element, and said change in said distance results in a change in a current of said electron beam.

46. An acceleration sensor according to claim 45 wherein said mounting means comprises at least one cantilever beam connected to said annular extraction electrode.

47. An acceleration sensor according to claim 45 wherein said mounting means comprises first and second dielectric stand-off layers, said first dielectric layer positioned between said collector and said extraction electrode around said cavity, and said second dielectric layer positioned between said extraction electrode and said at least one emitter element around said cavity.

48. An acceleration sensor according to claim 45 wherein said collector comprises a stiff conductive layer.

49. An acceleration sensor according to claim 45 wherein said field emission means comprises a first layer having a first conductivity and a second layer having a second conductivity thereby defining a junction.

50. An acceleration sensor according to claim 45 wherein said at least one emitter element comprises at least one raised emitter tip having a semiconductor coated surface.

51. An acceleration sensor according to claim 45 wherein said cavity is evacuated.

52. A acceleration sensor according to claim 45 further comprising:
  first electrical biasing means for providing a first electrical potential between said at least one emitter element and said annular extraction electrode;
  second electrical biasing means for providing a second electrical potential between said at least one emitter element and said collector; and
  measurement means for measuring said electron beam current.

* * * * *